(12) United States Patent
Raiman

(10) Patent No.: US 10,901,715 B1
(45) Date of Patent: Jan. 26, 2021

(54) LAZY COMPILATION AND KERNEL FUSION IN DYNAMIC COMPUTATION GRAPHS

(71) Applicant: Jonathan Raiman, San Francisco, CA (US)

(72) Inventor: Jonathan Raiman, San Francisco, CA (US)

(*) Notice: Subject to any disclaimer, the term of this patent is extended or adjusted under 35 U.S.C. 154(b) by 0 days.

(21) Appl. No.: 16/583,979

(22) Filed: Sep. 26, 2019

(51) Int. Cl.
*G06F 8/41* (2018.01)
*G06F 9/455* (2018.01)
*G06F 11/36* (2006.01)

(52) U.S. Cl.
CPC ............ *G06F 8/443* (2013.01); *G06F 9/4552* (2013.01); *G06F 11/3608* (2013.01)

(58) Field of Classification Search
None
See application file for complete search history.

(56) References Cited

U.S. PATENT DOCUMENTS

| | | | | |
|---|---|---|---|---|
| 5,822,593 | A * | 10/1998 | Lamping | G06F 8/30 717/161 |
| 6,760,905 | B1 * | 7/2004 | Hostetter | G06F 9/44521 717/148 |
| 9,798,527 | B1 * | 10/2017 | Bendersky | G06F 16/9024 |
| 2016/0179653 | A1 * | 6/2016 | Suzuki | G06F 8/72 717/126 |
| 2020/0081445 | A1 * | 3/2020 | Stetson | B60W 60/001 |

OTHER PUBLICATIONS

Chen et al., Training Deep Nets with Sublinear Memory Cost, University of Washington, Apr. 22, 2016; https://arxiv.org/pdf/1604.06174.pdf.
Rotem et al., Glow: Graph Lowering Compiler Techniques for Neural Networks. Apr. 3, 2019; https://arxiv.org/pdf/1805.00907.pdf.

(Continued)

*Primary Examiner* — Qing Chen
(74) *Attorney, Agent, or Firm* — Cognition IP, P.C.; Edward Steakley

(57) ABSTRACT

Methods, systems, and apparatus, including computer programs encoded on computer storage media, for lazy compilation and kernel fusion in dynamic computation graphs. One of the operations is performed by generating an input graph based on translation of user code into an expression graph. The expression graph represents control flow dependencies of operations of the generated input graph. Optimization of the input graph is then performed by iterative application of optimization rules to the input graph. An optimized version of the input graph results from the application of the optimization rules. A transformation graph then is generated by comparing changes made from the original input graph to the final optimized version of the input graph. The transformation graph provides a blueprint such that the system may recreate the optimization of a similarly structured later generated input graph without having to reapply the optimization rules. During the optimization of the input graph, the system may also generate fused blocks of just-in-time operations which the system may later optimize for parallel processing on one or more graphic processing units, and/or hardware accelerated computation units.

18 Claims, 11 Drawing Sheets

(56) References Cited

OTHER PUBLICATIONS

Chen et al., Tvm: End-to-End Compilation Stack for Deep Learning, SysML Conference, Feb. 18, 2018; https://huyuwei.github.io/papers/SYSML_18_TVM.pdf.

Sailsman et al., Saving memory using Gradient Checkpointing. https://github.com/openai/gradient-checkpointing, 2018. (accessed Nov. 13, 2019).

Vasilache et al., Tensor Comprehensions: Framework-Agnostic High-Performance Machine Learning Abstractions, Facebook AI Research Technical Report, Feb. 13, 2018; https://arxiv.org/pdf/1802.04730.pdf.

Tensorflow. XLA Overview.https://www.tensorflow.org/performance/xla/ 2018. (accessed Nov. 13, 2019).

Torch Contributors. Torch Script. https://pytorch.org/docs/master/jit.html 2018. (accessed Nov. 13, 2019).

Neubig et al., On-the-fly Operation Batching in Dynamic Computation Graphs. 31st Conference on Neural Information Processing Systems (NIPS 2017), pp. 3971-3981, 2017; https://arxiv.org/abs/1705.07860.

Chetlur et al., cudnn: Efficient Primitives for Deep Learning, NVIDIA, Dec. 18, 2014; https://arxiv.org/pdf/1410.0759.pdf.

Hart et al., A Formal Basis for the Heuristic Determination of Minimum Cost Paths. IEEE transactions on Systems Science and Cybernetics, 4(2):100-107, 1968 https://ieeexplore.ieee.org/document/4082128.

Ragan-Kelley et al., Halide: A Language and Compiler for Optimizing Parallelism, Locality, and Recomputation in Image Processing Pipelines, PLDI 2013; people.csail.mit.edu/jrk/halide-pldi13.pdf.

Ba, Jimmy Lei et al., Layer Normalization, Jul. 21, 2016; https://arxiv.org/abs/1607.06450.

Mirhoseini, Azalia et al., A Hierarchical Model for Device Placement, ICLR 2018; https://openreview.net/pdf?id=Hkc-TeZ0W.

Mirhoseini, Azalia et al., Device Placement Optimization with Reinforcement Learning, Proceedings of the 34th International Conference on Machine Learning, Jun. 25, 2017; https://arxiv.org/abs/1706.04972.

Srivastava et al., Dropout: A Simple Way to Prevent Neural Networks from Overfilling, Journal of Machine Learning Research, 15(1):1929-1958, 2014; www.cs.toronto.edu/~hinton/absps/JMLRdropout.pdf.

Howes et al., Efficient Random Number Generation and Application Using Cuda, GPUgems, 3:805-830, 2007; https://pdfs.semanticscholar.org/ab7b/de355450c3c3ba564e7ea6b784a759ab1e1f.pdf.

Vaswani et al., Attention Is All You Need, 31st Conference on Neural Information Processing Systems (NIPS 2017) pp. 5998-6008, Dec. 6, 2017; https://arxiv.org/pdf/1706.03762.

Chelba et al., One Billion Word Benchmark for Measuring Progress in Statistical Language Modeling, Dec. 11, 2013; https://arxiv.org/pdf/1312.3005.

Vaswani et al., Tensor2Tensor for Neural Machine Translation; Mar. 16, 2018; arXiv:1803.07416v1.

Radford et al., Learning to Generate Reviews and Discovering Sentiment, Apr. 6, 2017; https://arxiv.org/abs/1704.01444.

McAuley et al., Inferring Networks of Substitutable and Complementary Products, Proceedings of the 21th ACM SIGKDD international conference on knowledge discovery and data mining, pp. 785-794. ACM, Jul. 1, 2015; https://arxiv.org/pdf/1506.08839v1.pdf.

Paszke et al., PyTorch: Tensors and Dynamic Neural Networks in Python with Strong GPU Acceleration, https://github.com/Tixxx/pytorch (accessed Nov. 13, 2019).

Innes. Don't Unroll Adjoint: Differentiating SSA-Form Programs, Oct. 18, 2018; https://arxiv.org/abs/1810.07951.

Pearlmutter et al., Using Programming Language Theory to Make Automatic Differentiation Sound and Efficient, Advances in Automatic Differentiation, pp. 79-90. Springer, 2008; www-bcl.cs.may.ie/~barak/papers/sound-efficient-ad2008.pdf.

Swift for TensorFlow, https://www.tensorflow.org/swift 2019 (accessed Nov. 13, 2019).

Agrawal et al., Tensorflow Eager: A Multi-Stage, Python-Embedded DSL for Machine Learning, Proceedings of the 2nd SysML Conference, 2019; https://arxiv.org/pdf/1903.01855.pdf.

Cypher et al., Intel ngraph: An Intermediate Representation, Compiler, and Executor for Deep Learning, SYSML 2018 Stanford University, Jan. 24, 2018; https://arxiv.org/abs/1801.08058.

Lattner et al., MLIR Primer: A Compiler Infrastructure for the End of Moore's Law, Compilers for Machine Learning Workshop, CGO 2019; https://storage.googleapis.com/pub-tools-public-publication-data/pdf/1c082b766d8e14b54.

Bondhugula et al., A Practical Automatic Polyhedral Parallelizer and Locality Optimizer, PLDI 2008; vol. 43, pp. 101-113; www.ece.lsu.edu/jxr/Publications-pdf/pldi08.pdf.

Verdoolaege et al., Polyhedral Parallel Code Generation for Cuda, ACM Transactions on Architecture and Code Optimization (TACO), 9(4):54, Jan. 2013; https://dl.acm.org/citation.cfm?id=2400713.

Chen et al., Learning to Optimize Tensor Programs, Advances in Neural Information Processing Systems, pp. 3389-3400, May 21, 2018; https://arxiv.org/pdf/1805.08166.pdf.

Bradbury; Matchbox: Automatic Batching for Dynamic Deep Learning, NVIDIA, Mar. 28, 2018; http://on-demand.gputechconf.com/gtc/2018/presentation/s8977-matchbox-automatic-batching-for-dynamic-deep-learning.pdf, 2018. (accessed Nov. 13, 2019).

Tensorflow. AutoGraph: Easy Control Flow for Graphs, 2018; https://www.tensorflow.org/guide/autograph (accessed Nov. 13, 2019).

* cited by examiner

| Name | Description |
|---|---|
| Chained Assignment Removal | Replace cases like $A = B = C$ by $A = C$, when assignment to $B$ can be skipped. |
| Chained Wait Statement | Replaces cases where one control flow statement is waiting on another control flow `ControlFlow(event=ControlFlow(event=Event, return=A), return=A)`, and could instead be replaced by `ControlFlow(event=Event, return=A)`. |
| Control Flow Elimination | Removes control flow statements whose dependencies are met. |
| JIT Fusion | Fuse together JIT-able expressions. |
| Convert Conv2D to im2col + matrix multiply | When running on CPU and no native convolution operation is defined, replace convolutions by a CPU-friendly chaining of `im2col` and `matrix multiply`. |
| Convert BiasAdd to regular addition | In cases where a specialized Bias Addition primitive is not available, replace this operation by a regular addition call. |
| Convert BiasAddBackward to regular sum | In cases where a specialized Bias Addition Backward primitive is not available, replace this operation by a regular sum call. |
| Convert Conv2DBackwardFilters to col2Im + matrix multiply | When running on CPU and no specialized convolution2d filters backward operation is defined, use `col2im` and `matrix multiplication` as a fallback. |
| Convert Conv2DBackwardInput to col2Im + matrix multiply | When running on CPU and no specialized convolution2d input backward operation is defined, use `col2im` and `matrix multiplication` as a fallback. |
| Merge elementwise multiplication and GEMM | Fold into the GEMM computation any multiplication by a scalar. |
| Elementwise simplication | mathematical identity simplications ($\sqrt{x^2} \to |x|$, etc.). |
| Convert Pool2D to Pool2DJIT | When a native Pool2D operation is not available, fall back to a JIT-compiled version. |
| Convert Pool2DBackward to Pool2DBackwardJIT | When a native Pool2DBackward operation is not available, fall back to a JIT-compiled version. |
| Reduction Fusion | Combine chained reduction operations into a single function (e.g. `x.sum(axis=0).sum(axis=1) → x.sum(axes=(0,1))`). |
| Convert Conv2D to CuDNNConv2D | When CuDNN is available, use their convolution operator. |
| Upgrade CuDNNConv2D | Run CuDNN's `find_best_convolution` operation to select the best implementation. |
| Convert Conv2DBackwardFilters to CuDNNConv2DBackwardFilters | When CuDNN is available, use their convolution backward filters operator. |
| Convert Conv2DBackwardInput to CuDNNConv2DBackwardInput | When CuDNN is available, use their convolution backward input operator. |
| Convert Pool2D to CuDNNPool2D | When CuDNN is available, use their pool2d operator. |
| Convert Pool2DBackward to CuDNNPool2DBackward | When CuDNN is available, use their pool2dbackward operator. |

FIG. 5

| Name | Description |
|---|---|
| Reshape | View an input expression's data using a different set of dimensions. |
| Broadcast | Duplicate input data along axes with dimension 1 (for instance: to have the same shape as another expression). |
| ExpandDims | Add a new dimension with dimension 1. |
| Squeeze | Remove a dimension that has dimension 1. |
| TileScalar | Duplicate a scalar expression to have some higher dimensional shape. |
| Tile | Replicate an expression along multiple axes. |
| Arange(start, step, size) | Generate a sequence of length size going from start, and incrementing by step. |
| CircularConvolution | convolve two arrays along their last dimension. |
| Col2Im | Convert image patches back to a single image array. |
| Im2Col | Convert an image into patches (e.g. to apply a convolution using a matrix multiply). |
| Diag(x, rows, cols) | Create a matrix with dimensions rows x cols, with x along the diagonal. |
| Gather(x, indices) | Select values from x at the locations given by indices. |
| GatherFromRows(x, indices) | Select values from x's columns using x[i, indices[i]]. |
| OneHot(indices, depth, on_value, off_value) | Add a dimension of size depth to indices, which is filled by off_value, and equals on_value at the index given by indices. |
| Outer(a,b) | Computes the outer product of a and b. |
| Pool2D | Computes a reduction over sub-windows of an input expression. |
| Pool2DBackward | Computes the partial gradient of Pool2D. |
| AxisReduce | Apply a reduction (e.g. sum, max, etc.) over a single axis of an expression. |
| AllReduce | Apply a reduction (e.g. sum, max, etc.) over all the axes of an expression. |
| ArgumentAxisReduce | Apply a reduction (e.g. sum, max, etc.) over a single axis of an expression and return the indices where extrema was reached. |
| ArgumentAllReduce | Apply a reduction (e.g. max, min, etc.) over all the axes of an expression and return the index an extrema was reached. |
| ElementWiseExpression(a, b, ...) | Apply a specific operation to all the elements of the input expression(s). |

FIG. 6

| Name | Operation |
|---|---|
| negate | $-x$ |
| sqrt | $\sqrt{x}$ |
| square | $x^2$ |
| abs | $|x|$ |
| sigmoid | $\frac{1}{1+e^{-x}}$ |
| dsigmoid | $x \cdot (1-x)$ |
| tanh | $\tanh(x)$ |
| dtanh | $1 - x \cdot x$ |
| exp | $e^x$ |
| softplus | $\log(1 + e^x)$ |
| softplus_backward | $\frac{e^x}{1+e^x}$ |
| inv | $\frac{1}{x}$ |
| relu | $\max(0, x)$ |
| relu_backward | $\begin{cases} 1 \text{ for } x > 0, \\ 0 \text{ otherwise} \end{cases}$ |
| log | $\log(x)$ |
| log_or_zero | $\begin{cases} \log(x) \text{ for } x > 0, \\ 0 \text{ otherwise} \end{cases}$ |
| sign | $\frac{x}{|x|}$ |
| cube | $x^3$ |
| rsqrt | $\frac{1}{\sqrt{x}}$ |
| isnotanumber | Returns 1 for invalid numbers, 0 otherwise. |
| isinfinity | Returns 1 for $\pm\infty$, 0 otherwise. |
| inverse_tanh | $\frac{1}{2} \cdot (\log(1+x) - \log(1-x))$ |
| error_function | $\text{erf}(x)$ |
| error_function_backward | $\frac{2}{\sqrt{\pi}} \cdot e^{-x^2}$ |
| gelu | $x \cdot 0.5 \cdot (1.0 + \text{erf}(x \cdot 0.7071067812))$ |
| gelu_backward | $0.5 + 0.5 \cdot \text{erf}(x \cdot 0.7071067812) + \frac{0.3989422 \cdot x}{\sqrt{e^{x^2}}}$ |
| swish | $x \cdot \text{sigmoid}(x)$ |
| swish_backward | $\text{sigmoid}(x) \cdot (1 + x \cdot (1.0 - \text{sigmoid}(x)))$ |

FIG. 7

| Name | Operation |
|---|---|
| equals | $\begin{cases} 1 \text{ if } a = b, \\ 0 \text{ otherwise} \end{cases}$ |
| add | $a + b$ |
| subtract | $a - b$ |
| eltmul | $a \cdot b$ |
| eltdiv | $\frac{a}{b}$ |
| power | $a^b$ |
| prelu | $\begin{cases} a \text{ if } a > 0, \\ a \cdot b \text{ otherwise} \end{cases}$ |
| clipped_relu | $\min(\max(x, 0), b)$ |
| clipped_relu_backward | $\begin{cases} 0 \text{ if } a > b, \\ 1 \text{ if } a > 0 \text{ and } a \leq b, \\ 0 \text{ otherwise} \end{cases}$ |
| steep_sigmoid | $\frac{1}{1+e^{-x}}$ |
| steep_sigmoid_backward | $b \cdot (x - x^2)$ |
| prelu_backward_weights | $\begin{cases} 0 \text{ if } a > 0, \\ a \cdot b \text{ otherwise} \end{cases}$ |
| prelu_backward_inputs | $\begin{cases} 1 \text{ if } a > 0, \\ b \text{ otherwise} \end{cases}$ |
| lessthanequal | $\begin{cases} 1 \text{ if } a \leq b, \\ 0 \text{ otherwise} \end{cases}$ |
| greaterthanequal | $\begin{cases} 1 \text{ if } a \geq b, \\ 0 \text{ otherwise} \end{cases}$ |
| greater | $\begin{cases} 1 \text{ if } a > b, \\ 0 \text{ otherwise} \end{cases}$ |
| max_scalar | $\max(a, b)$ |
| clip | $\max(\min(a, b), -b)$ |
| min_scalar | $\min(a, b)$ |
| binary_cross_entropy | $-(b \cdot \log(a) + (1 - b) \cdot \log(1 - a))$ |
| binary_cross_entropy_grad | $\frac{b-a}{a \cdot (a-1)}$ |

FIG. 8

LAZY COMPILATION AND KERNEL FUSION IN DYNAMIC COMPUTATION GRAPHS

BACKGROUND

Deep learning frameworks rely on two paradigms that are based on either static computation graphs or dynamic computation graphs. In many situations, a computation graph needs to be optimized such that the computation graph performs more efficiently and executes faster on a given hardware platform. With static computation graphs, operations to be performed by the computation graph are known in advance, and thus the operations can be easily revised and optimized prior to execution of the computation graph thereby improving performance.

However, with dynamic computation graphs, operations to be performed by underlying written code are not known ahead of time. The operations are determined dynamically as the processing of the dynamic computation graph occurs. In other words, the particular operations of a dynamic computation graph are not decided until execution of the computation graph with particular operations to be performed often depending on the contents or data of the dynamic computation graph. Current techniques and systems do not provide for effective optimization of dynamic computation graphs.

SUMMARY

Described herein is an exemplary system, method and a computer program product for lazy compilation and kernel fusion in dynamic computation graphs. The system, method and computer program product provide a lazy computation framework where code is initially written as to a desired computation graph. Graph operations are queued and then performed at the last possible moment when a result is needed. When that moment is called, then the queued operations are converted into a temporary input graph that may be optimized by the system to find opportunities to combine, reduce and/or delete certain operations thereby increasing the processing speed of the computation graph.

The system improves over existing frameworks regardless of whether the framework is dynamic or static. The system may perform optimizations as needed (i.e., "on the fly"), and can find groups of operations that can be compiled into unique kernels that would be used just this once for a computation in the form of what is called JITting. The system's JITting process is able to intelligently combine many sub-operations into a larger one (referred to herein as a JIT block) in a manner that has not been seen in the prior art. The system considers aspects of how operations may be combined together or simplified and determines the processing impact of combining those operations.

In general, one innovative aspect of the subject described in this specification can be embodied in systems, computer readable media, and methods that include operations for lazy compilation and kernel fusion in dynamic computation graphs. One of the operations is performed by generating an input graph based on translation of user code into an expression graph. The expression graph represents control flow dependencies of operations of the generated input graph. Optimization of the input graph is then performed by iterative application of optimization rules to the input graph. An optimized version of the input graph results from the application of the optimization rules. A transformation graph then is generated by comparing changes made from the original input graph to the final optimized version of the input graph. The transformation graph provides a blueprint such that the system may recreate the optimization of a similarly structured later generated input graph without having to reapply the optimization rules. During the optimization of the input graph, the system may also generate fused blocks of just-in-time operations (e.g., JIT blocks) which may later be optimized for parallel processing on one or more graphic processing units (GPUs), and/or hardware accelerated computation units (GPUs, Tensor Processing Units, Cerebras, Graphcore devices, etc.).

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 5 illustrates an exemplary list of optimization rules.

FIG. 6 illustrates an exemplary list of operations that the system may fuse and JIT-compile.

FIG. 7 illustrates an exemplary list of specializations of the elementwise operations for JIT compilation.

FIG. 8 illustrates an exemplary list of binary specializations for JIT compilation.

DETAILED DESCRIPTION

Figure 1:
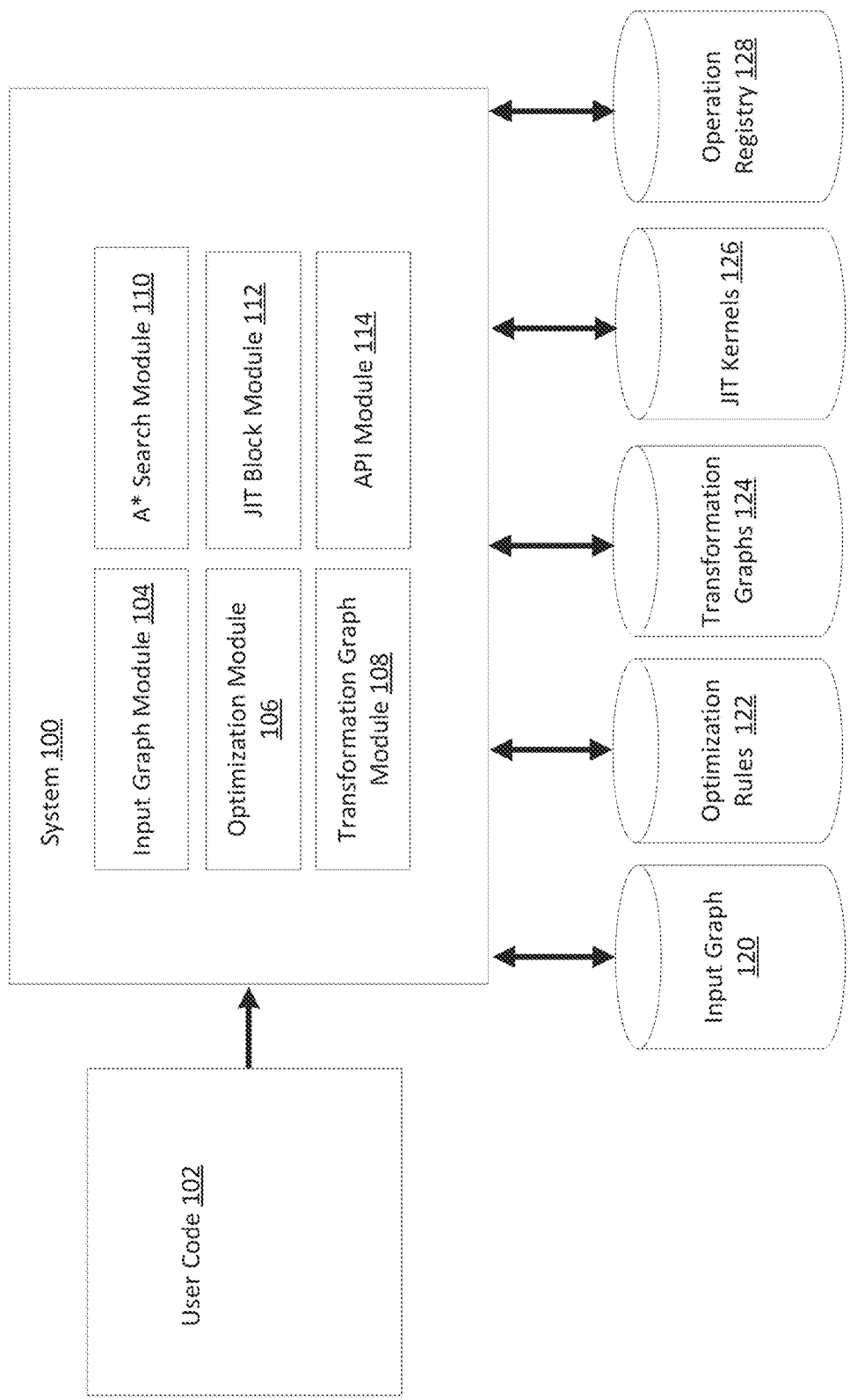
FIG. 1 illustrates a block diagram of an example system utilized in performing lazy compilation and kernel fusion in dynamic computation graphs.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1 illustrates a block diagram of an example system 100 utilized in performing lazy compilation and kernel fusion in dynamic computation graphs. The system 100 includes an input graph module 104, an optimization module 106, a transformation graph module 108, an A* search module 110, a JIT block module 112, and application program interface (API) module 114.

The input graph module 104 receives user code 102 as an input and translates the user code 102 into an input graph representing the computational operations of the user code 102. The optimization module 106 performs an iterative optimization process against the input graph by applying a set of optimization rules. The system 100 generates a final optimized input graph representing the application of the set of optimization rules. The transformation graph module 108 compares an original state of the input graph to a final optimized state of the input graph and generates a transformation graph. The A* search module performs an optimization process to determine an optimal approach to parallel processing of JIT blocks operations. The API module 114 allows the system 100 to receive inputs and commands from other systems and/or programs and provide data in response to the received inputs and commands. Other systems, programs, processes, and/or software may bridge into the system 100 where the system 100 provides an external library of functionality that may perform real-time dynamic optimizations of computation graphs.

The system 100 includes one or more electronic data stores 120, 122, 124, 126, 128 that may be locally or remotely accessed. These data stores (e.g., libraries, databases, memory cache, file systems, etc.), include, but are not limited to, an input graph database 120 which may be used to store information about an input graph and revised iterations of the input graph, an optimization rules library 122 which may include optimization rules for optimizing the input graph; a transformation graph library 124 which may include data describing a transformation graph and associated hash values, a JIT Kernels database 126 which may store code for execution of JIT kernels, and an operation registry 128 which may store operations and information about a referenced library from which the operations may be executed. While the data stores 120, 122, 124, 126 and 128 are displayed separately, the data and information maintained in a data store may be combined together or further separated in a manner the promotes retrieval and storage efficiency and/or data security. Moreover, the described modules and data stores may be configured in a distributed architecture where processing of the modules may occur on one or more user devices (such as a desktop, cell phone, tablet device), one or more separate servers or computers, cloud-based processing services and/or a combination thereof.

Process Overview

Figure 2:
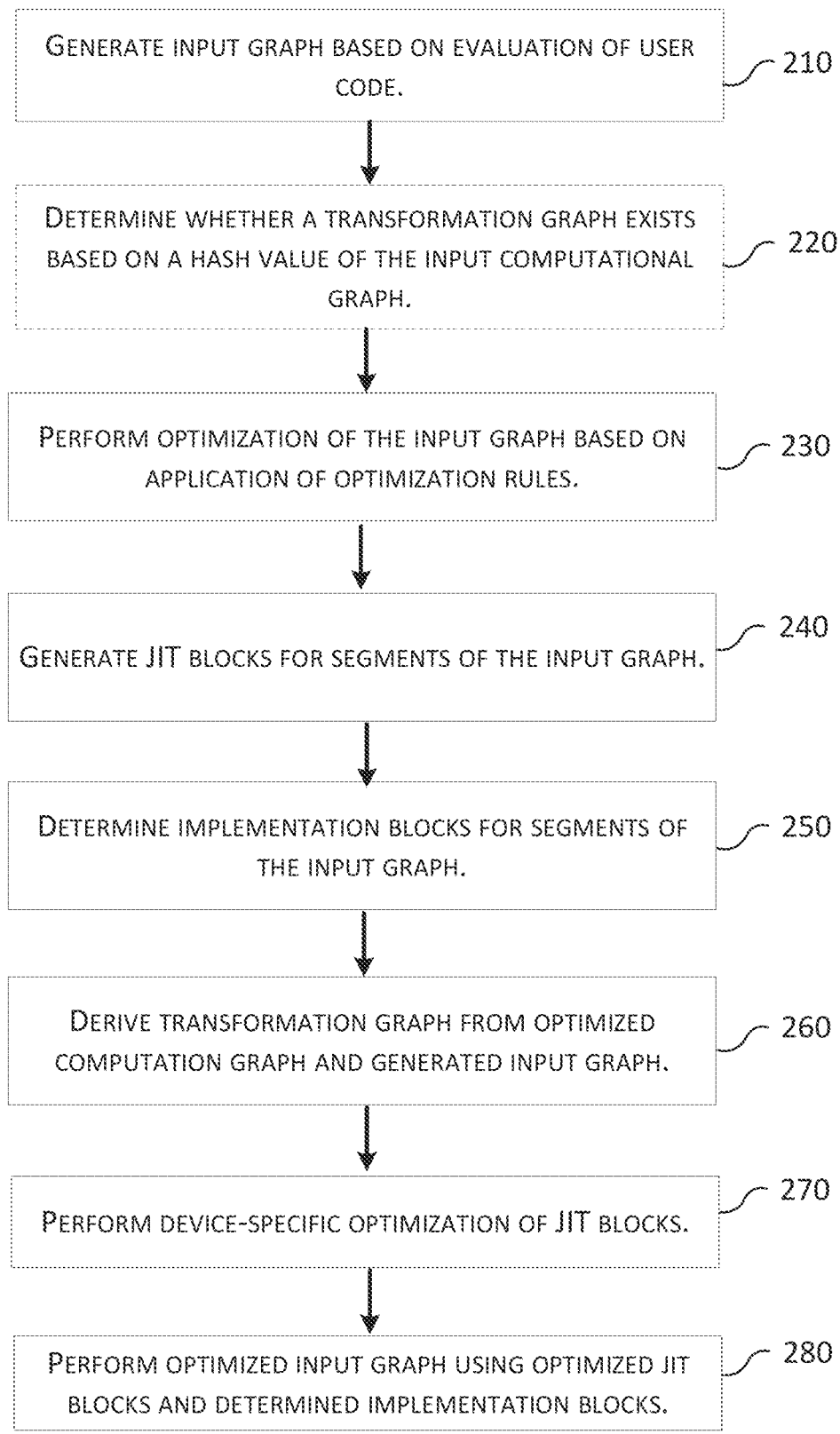
FIG. 2 illustrates a flow chart of an example process for performing lazy compilation and kernel fusion in dynamic computation graphs.

FIG. 2 illustrates a flow chart of an example process for performing lazy compilation and kernel fusion in dynamic computation graphs. The system 100 receives user code and generates an input graph based on evaluation and translation of the received user code (block 210). The user code is of the type used for computation graph processing and may be written in various programming languages (e.g., Python, C++, Ruby, JavaScript, etc.). The system 100 stores the generated input graph into an electronic data store.

The system 100 computes a hash value of the input graph and stores the hash value for later lookups of other generated input graphs to determine a graph structure match. The system 100 optionally looks up the hash value of a new input graph to determine whether a similarly structured input graph had been generated before. If the system 100 determines a hash value match exists to a previously stored hash value, then the system 100 may forgo the optimization processing of the new input graph and use a stored transformation graph to reconstruct an optimized version of the new input graph. A hash match indicates that the structure of a previous input graph has already been optimized and a transformation graph was generated.

The system 100 performs optimization of the input graph by applying a set of optimization rules to the generated input graph (block 230). The result of the application of the optimization rules is a final optimized input graph. The optimization rules make changes to the original structure of the generated input graph. Before applying the optimization rules, the system 100 optionally stores in an electronic data store, a copy of the structure of the generated input graph to save a copy of its original state (e.g., the structure). The system 100 creates and stores another copy of the structure of the input graph which is then used for in-situ modification where changes are made based on the requirements of particular optimization rules.

Some of the optimization rules may generate JIT blocks including portions or segments of the input graph nodes and/or operations (block 240). An optimization rule may evaluate the input graph to identify nodes and/or operations of the input graph that can be combined to form a JIT block that will later be evaluated by the system 100 for optimized GPU processing.

The system 100 also may determine implementation blocks for segments of the input graph that are non-JIT blocks (block 250). The system 100 may evaluate nodes of the optimized input graph and connect operations to vendor or reference libraries from an operation registry so that the system 100 may perform a particular operation of the input graph when the operation is to be executed. An implementation block includes the operations of the optimized input graph and a reference to a respective referenced library. For example, the system 100 may determine that a matrix multiply operation on a particular device may be executed using a specific library's function, such as using a matrix multiply function from a referenced library, such as an OpenBlas or CuBlas library.

The operation registry may be a database or other data structure where the system may reference a particular operation by name and retrieve an associated library function from which the operation may be performed. For example, the system 100 may include a registry of different types of operations and one or more libraries available to the system 100 for performing a specific operation. The system 100 may choose one library over another library based on the particular hardware configuration of the system 100 performing the operation. The system 100 may include an API where particular operations and a referenced library may be defined. This API allows the system 100 to define the registry with the identified operations and the one or more libraries that may be used perform the operation.

After the system 100 applies the optimization rules to the input graph, a final input graph will have been created. The system 100 derives a transformation graph by comparison of the structure of the original stored copy of the generated input graph to a structure of the final optimized version of the input graph (block 260). The transformation graph is stored in a data store and provides information to the system 100 about how to recreate the final optimized version of the input graph without having to reapply the optimization rules.

The system 100 then performs a device-specific optimization process of the JIT blocks based on the target device (e.g., CPU, GPU, TPU, etc.) upon which the kernel will be performed (block 270). In one embodiment, the JIT blocks include operations of the original input graph that the system 100 has combined together for GPU processing. The system 100 uses an A* search-based model to determine a processing approach that relies on a basic cost model of the GPU's memory and parallelism. The system 100 determines in what manner to parallelize operations of the JIT block (e.g., processing by blocks, threads, blocks+threads, or none (run sequentially)). The system generates GPU code based on the determined parallel processing approach. The system 100 generates GPU and/or CPU code which is then compiled to create one or more kernels to perform the operations of the JIT block, thereby creating a fused JIT kernel. The code for the fused JIT kernel (in machine or string form) may be stored in memory or on a storage device for later access and retrieval when the system 100 needs to perform the operations of the fused JIT kernel.

While general GPU processing should be understood by one skilled in the art, the following paragraph may aid one's understanding of the inventive subject matter described herein. A thread is an execution unit that runs kernels on a GPU. Kernels are functions that are executed in parallel on a GPU (e.g., a C language written function or program). Each thread has its own identifier and uses an index to access elements in an array. A collection of threads may cooperatively execute the same kernel for example to process a data set. A block (also referred to as a thread block) is a group of threads that can be executed serially or in parallel. All of the threads in a single thread block can communicate with one another. Multiple thread blocks may be combined to form a grid with each of the blocks of the grid containing the same number of threads. With a grid, a kernel is launched as a collection of thread blocks.

The system 100 then performs the optimized input graph code using optimized JIT blocks and the operations for the determined implementation block(s) (block 280). When a result is requested for an input graph, the system 100 performs the optimized version of the input graph. In some instances, the optimized input graph may not include any JIT blocks. In this instance, the operations of the optimized input graph are performed by the system 100, and a result of the optimized input graph is provided to a calling system, process, program or other code. The system 100 performs the operations of the non-JIT blocks using the referenced libraries of the implementation block(s). In other instances, the optimized input graph may include JIT blocks. In this case, the system 100 will access and execute the stored fused JIT kernel associated with the JIT block of the optimized input graph. In one embodiment of the system 100, some of the non-JIT block operations are performed by a CPU and the fused JIT kernels are performed by a GPU. In other embodiments, the system 100 may generate code and compile kernels for hardware accelerated processors such as Tensor Processing Units, Cerebras, Graphcore device and memristors.

Input Graph Generation

Figure 3:
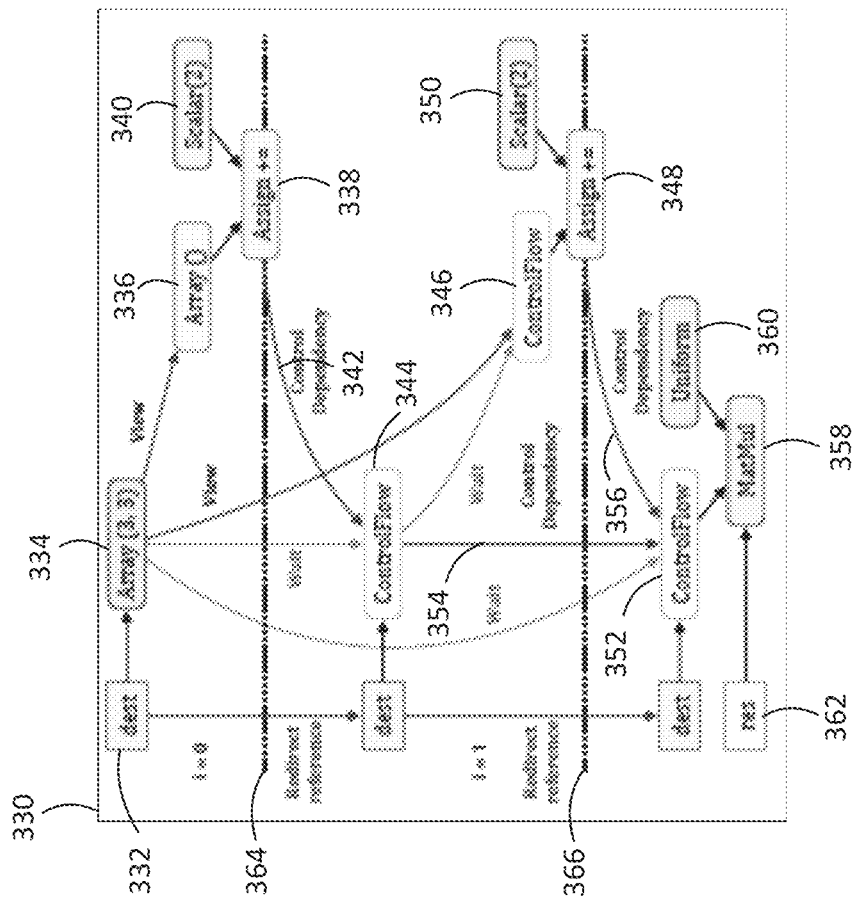
FIG. 3 illustrates an example of an input graph in the form of an expression graph generated from translation of user code.

FIG. 3 illustrates an example of an input graph in the form of an expression graph generated from user code. The system 100 translates received user code 300 into an input graph as represented by the expression graph 330. The system 100 translates the user code 300 into an input graph where ordering of operations becomes a directed graph. The input graph allows the system 100 to perform the operations with some knowledge of what is needed to be completed before the input graph can return the results of what the user code had otherwise expected.

While translating the user code 300, the system 100 iteratively appends new nodes and edges to create the expression graph 330 in a manner that logically represents the intended operations of the user code 300. The system 100 translates the user code 300 into dynamic control flow objects that have control dependencies with other objects where the other objects must be executed or performed before a respective control flow object may continue processing. Operations that modify memory replace the affected object by the associated transaction operation (e.g., assignment, read, etc.) last applied to it, thereby ensuring the user code 300 imperative order translates to the same partial order in the generated input graph. Operations are queued by the system 100 in a way that respects the original intent of the user code 300. Operations of the input graph generated by translation of the user code 300 are queued up until the moment when the operations are needed to be executed.

For example in FIG. 3, the user code 300 begins by creating an empty 3×3 matrix for the variable dest with the code "auto dest=Array({3, 3});". The expression graph 330 represents the matrix by the object called dest 332 that points to a 3×3 matrix 234.

In the next step of the user code 300 "for (int I=0; I<2; i++)", a loop from the number zero to the number 1 is performed. In this loop, the user code 300 selects some row and column of the matrix dest and will increment the sub-value of the matrix by 2. In terms of computation, whenever a process accesses this matrix again, the process expects the value of this specific location to be incremented by 2, and that result should be available in the matrix dest.

The expression graph 330 represents the array object 236 as a submatrix of the matrix 334. The expression graph represents a new operation object "Assign+=" 338 and a new scalar object 340 which indicates to increment the scalar object "Scalar(2)" 340 by a value of two. The assign operation object 238 describes what needs to be performed before accessing the matrix 334 or the object dest 332.

Dashed lines 364, 366 indicate variable dest 332 redirected to reflect a memory transaction. Below dashed line 364, the expression graph 330 represents that a control dependency 342 exists whenever the dest object is accessed again. To access the dest object, the assign operation object 338 needs to be executed before processing can continue. The control dependency 342 creates a locking mechanism or transaction by connecting the operation object 338 to the dest object via the control flow object 344. The dest object uses the control flow object 344 as its new reference.

The dashed line 366 near the bottom of the expression graph 330 is a similar control flow requirement repeated again. The expression graph 330 represents objects in which the processing is going to increment the control flow object 346 by a value of two. The expression graph 330 represents the same operation 348 as operation 338 and a new scalar object 350 which represents the increment by 2 as indicated by the scalar object "Scalar(2)" 350.

The expression graph 330 represents another control flow object 352. The second control flow object 352 is now relying on two events to be completed before processing can proceed. The control flow object 352 has two control dependencies 354, 356. Before being able to return its contents to any other object, the control flow object 352 waits for the first increment by two operation 338 and the second increment by two operation 348.

Now the user code 300 "auto res=op::matmul (dest, op::uniform(-1, 1, {3, 3}));", would compute a matrix multiply between dest and another matrix of uniform random noise sampled from the values of -1 to 1. The expression graph represents an object 358 "MatMul" for the matrix multiply operation, and an object 360 "Uniform" for the matrix of uniform random noise. The matrix multiply object 358 performs a matrix multiply operation using two objects, the control flow object 352 and the uniform matrix object 360. The result of the matrix multiply is represented by the object 362 "res".

By generation of the expression graph, the system 100 now has created a framework of the input graph and has determined a processing control flow for which nodes and operations of the computation graph must be completed and in which order. The system 100 may then optimize the input graph via application of optimization rules.

Input Graph Optimization

Figure 4:
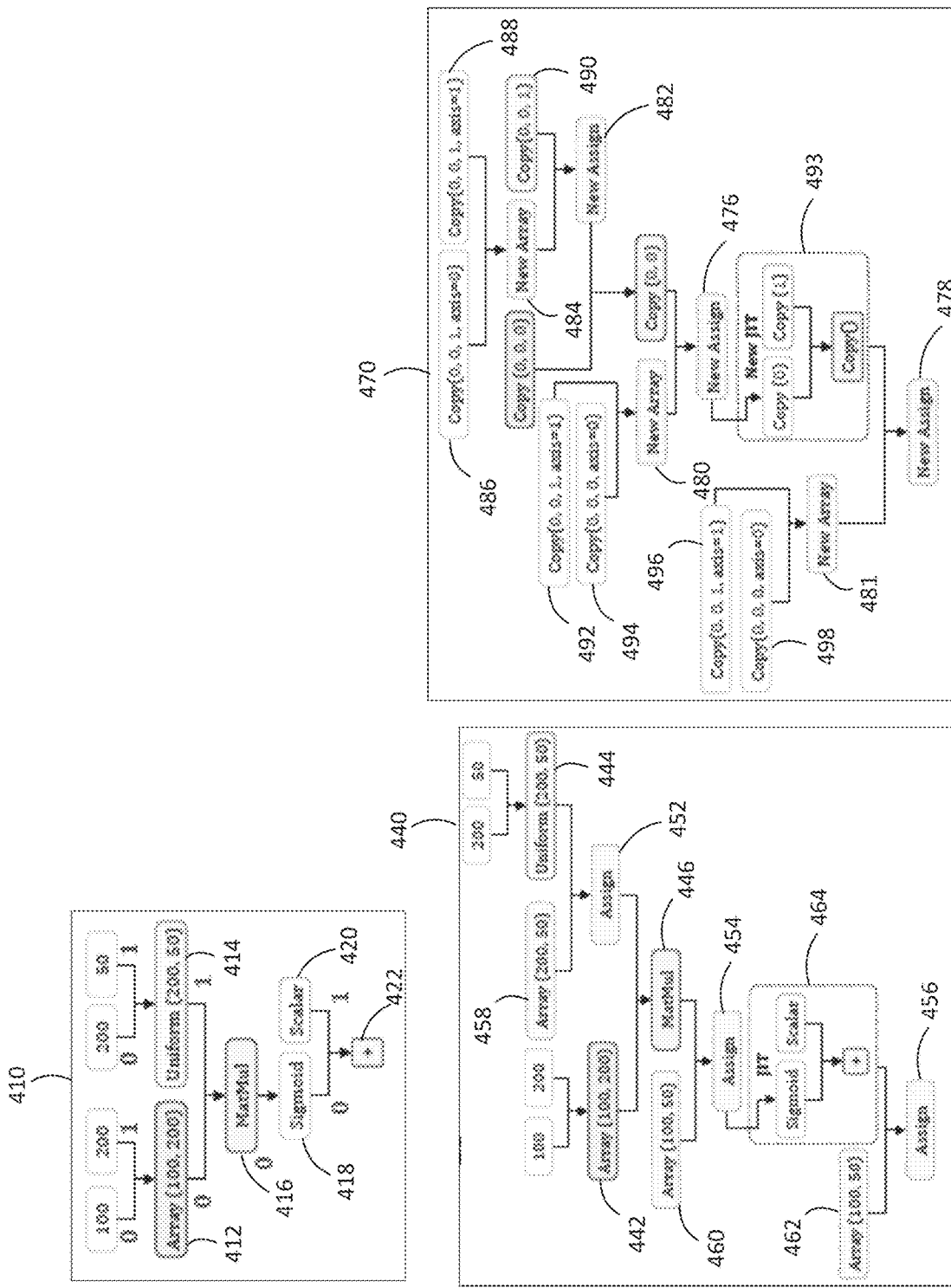
FIG. 4 illustrates an example of optimizing an input graph and generating a transformation graph.

FIG. 4 illustrates an example of the system 100 optimizing an input graph 410 to create a final optimized input graph 440 and generating a transformation graph 470 from the final optimized input graph 440. The system 100 receives as an input the generated input graph (i.e., the expression graph) and optimizes the input graph using optimization rules. The input graph 410 represents the generated expression graph 300 as described above. While not shown in the input graph 410, execution of the input graph 410 uses the generated control flow dependencies for execution of the input graph 410 and/or the final optimized input graph 440.

Optimization Rules

The system 100 optimizes the input graph 410 by applying a series of optimization rules and determining whether or not a modification may be made to a node or portion of the input graph 410. If an optimization rule is applicable to the node or portion of the input graph 410, then the system 100 applies the rule and modifies the particular node or portion of the input graph 410. After all of the optimization rules have been applied to the input graph 410, a final optimized input graph is generated 440. As further discussed below, the system 100 compares the original input graph to the final optimized input graph 340 to derive a transformation graph 470.

Optimization rules may be defined by a test function which receives a specific node in the input graph 410 and returns whether the optimization rule can be applied at the particular location of the node. An optimization rule may also include a transformation function that makes desired edits to the input graph 410. The optimization rules may be stored, locally or remotely, as a compiled library, database, file, listing or collection of rules in an electronic form retrievable by the system 100.

The optimization rules may define a test for whether or not certain operations of the input graph 310 should be run in their current form, or whether the operations can be rewritten and/or combined into a more efficient form for processing. For example, the system 100 may apply an optimization rule to determine whether a combination of a log and an exponential operation exists in the input graph 410. If the system 100 identifies the occurrence of this combination of operations in the input graph 410, the system 100 may delete the log and exponential operations and replace them with an identity expression. In another example, the system 100 may apply an optimization rule, such as a mathematical simplification rule, to evaluate the occurrence of certain operations performed by the input graph 410 and simplify those operations into a basic set of operations. A non-exhaustive example listing of optimization rules is provided in FIG. 5.

Multiple Optimization Passes

The system 100 uses an iterative, multiple optimization pass approach to optimize the input graph 410. Optimization rules may be registered or defined with a priority, ranking or execution order which indicates the order each pass of the optimization rules will be applied to the input graph 410. In addition to the registered optimization rules being applied, a simplification pass may be run by the system 100 on the input graph 410 to unify duplicated calls and assignments.

To ensure that transformations of input graph 410 nodes run in isolation of one another, the system 100 may run a particular optimization rule over the entire input graph 410 before running the next optimization rule. In other words, the system 100 traverses through each of the nodes of the input graph and applies the same optimization rule to each node of the input graph. For example, the system 100 would apply a first optimization rule to each node of the input graph 410 starting from the leaf nodes and moving to the other nodes of the input graph 410, and then after completing processing of the first optimization rule, the system 100 would apply a second optimization rule to each node of the input graph 410.

JIT-able Operations

During the optimization processing of the input graph 410, the system 100 may apply a particular type of optimization rule to determine JIT-able blocks of operations. A just-in-time (JIT) block, also referred to as a JIT block, is a collection of operations that may be fused together into a kernel for improved GPU processing (as discussed further below). The system 100 may determine whether nodes or portions of nodes of the input graph 410 may be combined together to form a JIT block. The system 100 may evaluate for nodes that are connected, or could have been connected, to form a JIT block. For example, the system 100 may apply an optimization rule that determines that a sigmoid and scalar operation may be combined into a JIT block of operations. The system 100 may apply heuristics that include a set of measurements to determine whether two or more operations of an input graph 310 should combined into a larger JIT block.

In some cases, the system 100 may recognize the structure of a JIT-able block of operations. For example, the system 100 may have already fused together a similar set of JIT block operations and created a kernel for those operations (such as softmax, attention or crossentropy operations). Rather than having to optimize the JIT block, the system 100 may instead forgo the optimization process, and invoke a previously stored JIT kernel for execution of the JIT block.

In-Place Modification of Input Graph

The system 100 in-place modifies a data structure of the input graph 410 in a memory cache when applying the optimization rules. The system 100 creates a data structure of the input graph 410 in the memory cache and modifies the data structure as applicable optimization rules are processed and make modifications to the input graph 410. For example, once the system 100 has applied a first optimization rule to the created data structure of the input graph 410, the data structure is revised with changes to the data structure indicating graph modification requirements of the first optimization rule. The system 100 may apply subsequent optimization rules which may also make revisions to the data structure. The resulting data structure would reflect the additional changes being made by subsequent optimization rules.

The system 100 applies a series of optimization rules and makes sequenced in-situ changes to the data structure of the input graph 410 in the memory cache. A final result of the series of optimization rules being applied to the first input graph 410 is the generation of a final optimized input graph 440 (i.e., an optimized final data structure of the input graph). The system 100 may then take a snapshot or make a copy of the final optimized input graph 440 data structure and save the structure in a memory cache or to a data storage device.

By having made in-situ changes to the data structure of the input graph 440, the system 100 may then compare the final optimized data structure to a previously stored version of the data structure of the original generated input graph. The system 100 may determine which nodes of the original input graph have changed, and which of the nodes have not. The system 100 may compare the data structure of the original input graph 410 to the final data structure of the optimized input graph 440. As further described below, the system 100 may evaluate the differences of the original input graph 410 and the final optimized input graph 440 to generate the transformation graph 470.

While the system 100 does not need to store or create transactions or logs about what modifications are being made to the input graph 410 during the optimization process, the system 100 may, nevertheless, be configured to generate transactional logs of the changes being made to the input graph as the optimization rules are being applied. The transactional logs may assist in understanding the step-by-step application of the optimization rules to the input graph.

Optimization Example

Referring again to FIG. 4, a more detailed discussion of the optimization of an input graph ensues. As noted previously, the input graph 410 logically represents a computation graph of written user code, and what is expected to happen when the user code is run. The input graph 410 represents the sequence of elements the system 100 needs to obtain in order to determine the result of the addition operation 422. In order to obtain the result of the addition operation 422, the system 100 needs to determine the result of the sigmoid operation 418 and scalar operation 402. The sigmoid operation 418 needs to compute the result of the matmul operation 416. The matmul operation 416 needs to compute the result of the uniform operation 414, and so forth.

Input graph 410 includes two possible inputs for a first array 412 that is dimensioned 100 by 200, and second array 414 of uniform random numbers that is dimensioned 200 by 50. A matrix multiply operation 416 is performed on the two arrays 412, 414. A sigmoid nonlinearity function 418 is applied to the output of the matrix multiply 416 operation generating a result. Then some scalar number 420 is added to that result.

Graph 440 exemplifies a final optimized input graph after optimization rules have been applied to the input graph 410. The system 100 saves every operation of the input graph 410 to some memory location. Each operation needs to have some output and is represented by the assign objects 452, 454 and 456. The assign object 452 indicates that the uniform random numbers 444 needs to be stored in memory and will be stored in an array 458 dimensioned 200 by 50. The assign object 454 indicates that the result of the matrix multiply operation 446 needs to be stored in memory and will be stored in an array 460 dimensioned 100 by 50. The assign object 456 indicates that addition of the output of the sigmoid function and the scalar value needs to be store in memory and will be stored in an array 462 dimensioned 100 by 50.

As noted previously, the system 100 may evaluate operations to combine them into JIT blocks. In the example optimized input graph 440, the system 100 has combined the sigmoid operation 418, scalar operation 420, and add operation of the original input graph 410 into a single JIT block 464 that did not previously exist. The new JIT block 464 receives as input the output of the matrix multiply operation 446. The system 100 saves the JIT block 464 to an assigned location, e.g., in a memory cache or data store, and executes the JIT block when it is ready to be performed. As discussed below, the system 100 may perform further processing on the JIT block to determine an optimized fused kernel approach.

The system 100 may perform the operations of the final optimized input graph 440 when the result of the final optimized input graph 400 is needed (e.g., when the result of the assign object 456 is needed). For instance, the system 100 may receive a request from another control source, program, software, process, function or program code asking or calling for the result. Until such time that the result is needed or requested, the system 100 may have already queued the operations of the final optimized input graph 440 in memory, and then perform the operations of the graph 440 when the result is needed. Alternatively, the system 100 when receiving a request for the result, may in response to the request, in real-time (i.e., dynamically) generate the input graph, optimize the input graph and then perform the operations of the optimized input graph.

When processing the operations of the final optimized input graph 440, the system 100 determines the required inputs for other operations of the graph in a hierarchical or precedential order. For example, the system 100 would first determine the assign operation 452, determine the assign operation 454 and then lastly determine the assign operation 456 (i.e., the result of the input graph). The system 100 stages and computes the three assign operations 452, 454, 456 in order, executes the respect assign operation before handing off its results to another node or function.

For each of the operations to be performed by the final optimized input graph 440, the system 100 may use a library of pre-written and/or pre-compiled code to perform the operation of a respective node of the graph. In other words, for a respective node of the final optimized input graph 440, the system 100 may make a call to a library function to perform a particular operation required by the node. For example, for the matmul operation 446, the system 100 may access a library of functions, where one of the library functions is able to take two input matrices and compute a matrix multiply. The library of functions may be a database, file, program, process and/or an API accessible to the system 100.

The system 100 may generate a mapping from the nodes of the final optimized input graph 440 to a set of functions from the library that should be run by the system 100 when a particular node is executed. In some cases, common functions for a set of computation graph operations may exist, such as a matrix multiply operation or operations for image convolutions. In other cases, a referenced function may not exist for the operation of the particular node being executed. This may occur, for example, when the system 100 executes a JIT block 464 for the first time. The system 100 would need to first compile and/or optimize the JIT block (as described herein), and then the system 100 may then perform the fused JIT block. The system 100 may optionally store the compiled and/or optimized code for later retrieval should the system 100 need to execute the JIT block again as to another generated input graph.

Generation of Transformation Graph

Having completed generation of the optimized input graph 440, the system 100 constructs a transformation graph 470. The system 100 may create a data structure in a memory cache to represent the transformation graph 479. The transformation graph 470 represents short-cuts describing the operations performed by the final optimized input graph 440. The system 100 builds a skeleton (e.g. a data structure) of the output of the final optimized input graph 440.

To recover the transformation that takes the input graph 410 to the final optimized input graph 440, the system 100 traces the effect of each transformation of the optimization rules from the optimization passes. The system 100 constructs in a memory cache, a placeholder target graph which has the same graph structure as the final optimized input graph 440, but with all nodes now containing reconstruction information. Each node of the placeholder target graph contains one of two types of reconstruction information:

1. Retrieval from the input graph 410: if a node in the optimized graph 440 was left unchanged from its state in the input graph 410, then the system 100 stores a path from the root of the input graph 410 to the nodes 486, 488, 492, 494, 496, 498 marked "Copy" in the transformation graph 470. Any suitable path reference identification construct may be used to locate and reference the nodes of the graph. In one embodiment, each expression contains zero or more arguments, so a path can be generated by storing a list of indices indicating which argument of a node that must be traversed to arrive at the node desired to be retrieved. In other embodiment, the path may be a single index indicating which of the input nodes the system 100 may reference (e.g., traversing particular nodes of the graph in some pre-determined order.)

2. A function that constructs the node anew along with some recovery information. For example, if temporary storage is created during the optimization pass to store intermediary results, then the system 100 saves instructions 480, 481, 484 stating "New Array" in the transformation graph 470, with a shape given by retrieving the strides and dimensions from the input graph 410

In places within the optimized input graph 440 where some object was copied wholesale from the original input graph 410, the transformation graph 470 indicates to copy the object over unchanged. The system 100 identifies the object's location and where to find it in memory.

In places where some new object that did not exist before has been created in the optimized input graph 440, the system 100 generates instructions about how to make those changes again. For example, in the transformation graph 470, the new assign object 482 indicates the system 100 to assign data into a new array 484 that has dimensions that are copied over from the input graph 410 as indicated by copy objects 486, 488. One of the inputs to the new assign 482 operation is going to be the random uniform box 444 from the optimized input graph 440 as indicated by the copy object 490. The new assign objects 476, 478, 482 of the transformation respectively correspond to the assign objects 452, 454, 456 of the of the optimized graph 440.

The copy object 490 provides instructions of how to find the copied object from a memory location. The system 100 may evaluate the differences from the data structures of the original input graph 410 and the data structure of final optimized input graph 440 to determine what are the copy operations for the transformation graph 470, and which operations are new.

From the point of view of the transformation graph 470 regarding data or graph contents, the system 100 essentially forgets about the edges of the input graph 410. The system 100 treats the input graph 410 as a placeholder in which wholesale nodes may be copied, and each of the edges get recreated in the output. The edges in the transformation graph 470 are the same as the edges in the final optimized input graph 440. The transformation graph 470 has a similar skeleton of the final optimized input graph 440. Both graphs 440, 470 have a similar backbone of edges and nodes. However, the contents of the nodes in what the system 100 is going to modify by evaluating a new input graph 410 would change.

Evaluation of New Input Graphs

Via the transformation graph 470, the system 100 caches the transformations that were applied to an earlier generated input graph and reapplies them to new or subsequently generated input graphs that have the same structure and operations of the earlier generated input graph, but which may have different and/or identical contents or data. Applying a previously stored transformation graph 470 to a newly generated input graph allows the system 100 to forgo applying the optimization rules to the newly generated input graph thereby increasing overall processing efficiency and performance.

After the transformation graph 470 has been generated, the system 100 may store the transformation graph in a memory cache and/or on a storage device for subsequent access. Also, the system 100 generates a hash value of the original generated non-optimized version of the input graph 410, and stores the hash value in a memory cache and/or on a storage device, and associates the hash value of the original generated non-optimized version of the input graph with the transformation graph 470. The hash value represents a unique identifier of the structure of the original non-optimized input graph 410.

During processing of a newly generated input graph, the system 100 may calculate a hash value for the newly generated input graph. The system 100 compares the hash value of the new input graph to hash values that had been previously stored in a lookup table in the memory cache. If a new input graph hashes to what the system 100 has identified before (e.g., a hash value match), the system 100 may skip the optimization process for the newly generated input graph. In other words, the system 100 does not need to apply the optimization rules to the newly generated input graph. By determining a hash value match, the system 100 recognizes that the structure of the newly generated input graph has a similar structure of a previously optimized input graph. The system 100 may then retrieve the stored transformation graph information from stored memory based on the hash value. The system 100 then uses the retrieved transformation graph 470 information and processes the retrieved transformation graph 470 against the newly generated input graph to derive an optimized version of the newly generated input graph.

A hash match or other suitable identifier of the structure of input graph may be used to identify an input graph. In one embodiment, the system 100 uses a sequence of shifts and XOR operations on integers and booleans that are indicative of states of different elements of the input graph. During the hashing process, the system 100 follows a deterministic order in which the system traverses an input graph 1004.

The system 100 evaluates the input graph in a top-down manner where the top is considered the root of the input graph, and down direction are the leaves of the input graph. The system 100 builds up a hash identity for each local node using its type. For example, the hash identity may include a string for the name of the node's operation (such as an addition, multiplication, control flow, matrix multiply, etc.). The system 100 uses the hashing of the string using a shift in XOR of the character integers thereby creating an identify for the name. Additional information for the dimensionalities for the node (e.g., 1-d, 2-d, 3-d, n-d) may be included. Each of the node of the input graph has associated with it a dimensionality to describe its shape. This information can be used to create a more unique identifier associated with the node. Each node of the input graph also may have an API that allows the node to specify additional meta-data when its being hashed. This additional information allows the system 100 to hash on this information as well to create a unique identifier for the node. For example, if the node handles memory storage, the node may have a boolean to identify whether the node is using strided or contiguous memory. In another example, if the node handles casting to a different data type, such as converting numbers from a float to an integer representation. The system 100 may add to the hash values related to the precision of the integer representation or the type of casting that is going to be by the node where the node specifies the type of truncation (e.g., values 1, 2 or 3 to specify the type of truncation). The hashing process thereby creates a local hashed identify for each of the nodes of the input graph. The system 100 may store the collective local hashed identify on a data storage device or accessible memory for later retrieval.

To determine a hash match, the system 100 may compare hash values for the first hashed input graph to a second hashed input graph. The system 100 may take the local identity of each of the nodes in the manner in which they are stored, and compare the root node and respective child nodes to determine whether each of the local identities of nodes of the first input graph match the local identities of nodes of the second input graph. If the local identities of the nodes of both graphs match, then the system 100 may confirm that the input graphs are similar, and use a transformation graph as discussed below to optimize the second input graph.

Basically, the transformation graph 470 lays out a blueprint of what happened as a result of the system 100 processing a non-optimized input graph to create a final optimized input graph. The transformation graph 470 is not a data structure that will be executed per se to obtain the results of the computation of an input graph. Rather, the transformation graph 470 is a set of information that the system 100 may use to generate an optimized version of a newly generated input graph. During optimization processing, there were nodes of the final optimized input graph that were copied over from the original input graph, and there were new nodes created as part of the final optimized input graph.

In transforming a new input graph to an optimized input graph, the system 100 creates a data structure in memory to build out an optimized version of the new input graph. The system may start at node 478, and at that location the system 100 understands to create a new assignment node that takes two inputs. The system 100 create a new assignment object in the data structure which represents the assignment operation 478. The system 100 recursively determines the inputs to the assignment operation 478. For example, the system determines how to recreate the assignment operation 482 and the assignment operation 476. The system 100 walks through the structure of transformation graph 478 and creates new objects in the data structure in memory based on the "new" designation for a particular node of the transformation graph 478 (e.g., nodes 481, 476, 480, 482 and 484).

When the system reaches a node in the transformation graph 478 indicated as "copy" (e.g., nodes 486, 488, 490, 492, 494, 496, 498) the system 100 may copy the node and/or contents of the node into the new data structure in memory. For example, when evaluating node 490 of the transformation graph, the system 100, instead of creating a new object, copies the object of the new generated input graph that is located at location 0,0,1 (reading node levels from bottom to top) of the structure of the generated input graph. As indicated before, the newly generated input graph has a similar structure as the original input graph.

As a result of transforming a newly generated input graph via the transformation graph 470, the system 100 create a new input graph structure similar to that of the final optimized input graph 440, yet the new input graph structure may have different data contents than the contents of the original input graph. The system 100 uses the new input graph structure to perform computation graph operations when a result is requested for the newly generated input graph.

As benefit of using the cached transformation graph 470, the system 100 effectively has removed processing for the x number of optimization rules that otherwise would have been applied to the newly generated input graph. By omitting the optimization process for the newly generated input graph, the system 100 may save a significant amount of processing time.

A* Fused CUDA Kernel Search

JIT Block Fusion

As discussed above, an optimization rule may determine that various nodes of an input graph may be combined to form one or more JIT blocks. Some nodes of an input graph are determined to be JITable, while others are not. FIG. 6 represents a non-comprehensive table of operations that the system 100 may fuse and JIT-compile. Some JIT operations are specialized using functors. Unary specializations of elementwise operations are shown in FIG. 7, and binary specializations show in FIG. 8.

To construct a JIT block, the system 100 may consider connected subtrees of the full input graph that include JIT-able expressions (e.g., Sigmoid 418+Scalar 420 in FIG. 4). If the parent of a JIT-able expression is also JIT-able, the system 100 may opt to combine those two operations into a single computation unit through fusion to form a JIT block. The combined set of operations may now be acted upon and treated by the system 100 as a single operation. This process of connecting JIT-able expressions is repeated by the system 100 until identified JIT-able expressions are fused to their neighbors.

The system 100 may determine that smaller JIT blocks can be combined into a larger JIT block. The system 100 may also determine that a larger JIT block may be divided into smaller JIT blocks, even though the nodes could have otherwise been combined into a single JIT block. For example, the system 100 may set a maximum number of operations that may be combined together to form a JIT block. The system 100 combines the JITable nodes of an input graph until reaching a predetermined number of operations to be included in the JIT block. Once the threshold number of operations is reached, the system 100 may combine subsequent JITable nodes into another JIT block. Some input graphs would then have multiple JIT block of various JITable operations.

The system 100 may also determine whether or not combined JITable operations would increase the number of input arrays needed for the JIT block. If the system 100 determines that the number of input arrays needed for the JIT block meets or exceeds some threshold value of maximum input arrays, then the system 100 may truncate the JIT block at the location of the last operation and create a new JIT block for subsequent remaining operations.

Referring back to FIG. 4, a very simple JIT block 464 was created in the optimized input graph 440 and is also reflected as a new JIT block 493 in the transformation graph 470. The system 100 dynamically generates one or more segments of code by evaluating the JIT blocks of the final optimized input graph 440 and determines an optimized GPU and/or CPU processing approach. For example, the operations of JIT block 464, the sigmoid, scalar and addition operation would be fused together and run as a segment of system 100 generated code to be executed on one or more graphical processing units (GPUs) and/or computer processing units (CPUs).

The system 100 evaluates the JIT block 440 operations (e.g., the sigmoid, scalar, and addition operations), and determines what dimensional space (e.g., a multi-dimensional array or matrix) is needed for performing the JIT block, and the shape of the inputs to the JIT block 440. The system 100 uses this information to generate an approach to run the JIT block operations in parallel on one or more GPUs and/or CPUs. For example, the system 100 may combine JIT block operations into code strings that are later used to compile JIT kernels (such as CUDA C or CPU C code). CUDA is a parallel computing platform and programming model used to program code for GPU processing.

The system 100 may determine whether JIT block operations use some high dimensional space. The system 100 may determine that in some cases GPU processing of certain operations may be optimally performed using block level parallelism for some dimensions, and that certain operations may be optimally performed using thread level parallelism for other dimensions. And for other operations the system may determine that such operation should be performed sequentially in a non-parallel manner. The determination of optimal block or thread level parallelism is performed by an A* search process.

A* Search Process

The system 100 performs an optimization process to determine an approach to process the JIT blocks on the one or more GPUs and/or CPUs. The system 100 uses a search-based approach that relies on a basic cost model of the GPU's memory and parallelism. The search approach uses a heuristic to maximize parallelism which does not require compilation to estimate performance. The heuristic weighs the total number of loops of the final optimized input graph against the number of unique parallelism types exposed while penalizing the number of loops that have to be run sequentially. The heuristic sets unassigned loop to be maximally parallel. This provides a valid upper bound on the remaining parallelism opportunities.

Once the system 100 has determined all of the loops and data-consistency constraints related to the input graph, the system 100 may apply graph search over the assignment of parallelism types to loops while avoiding incorrect assignments (e.g., two loops that are nested cannot both rely on blocks to do their iteration, since the sub-expression is only evaluated when the parent is active, the inner loop's block iteration will never fully execute).

Each JIT-able expression provides information about the for-loops and access pattern over its inputs. This information enables the system 100 to determine an appropriate way of combining multiple reductions and elementwise operations into a single kernel while remaining data consistent. Iterators belonging to a loop can be annotated to state they will access data non-sequentially, indicating a possible violation of data-consistency if the read data was generated in a different block. If this iterator is used to access an intermediary result in the kernel, the system 100 may disallow block-level parallelism over the loop that created this iterator. Loops of JIT block operations are annotated with the available ways to parallelize them (blocks, threads, blocks+ threads, or none (run sequentially)). The system 100 looks for repeated sub-expressions or broadcasts within a JIT subgraph and adds temporary assignments within the generated code to avoid recomputing the results.

The system 100 uses an A* search algorithm which utilizes a couple of pieces of information. The system 100 evaluates what is the desired goal state, and what is the transition cost incurred every time a temporary solution is modified. The system 100 may query a cost function before the system 100 performs a change to the temporary solution. The system 100 uses a heuristic function that tells the system 100 the expected cost to go forward with the solution. The system 100 may use an informative heuristic to perform the A* search to perform fast search that avoids large parts of the search base that is otherwise not useful.

Using the heuristic and a cost estimate, the system 100 may use the A* search algorithm to search through the space of valid solutions and find an optimal solution. The system 100 may perform redundancy detection checks to determine if two loops are descendants of each other, have the same symbolic size and/or whether they have equal access to using threads or blocks.

To evaluate the quality of a solution, the system 100 may use the following cost estimate g, where N is the total number of loops to parallelize, $N_{blocks}$, $N_{threads}$, $N_{blocksThreads}$ are the numbers of loops using blocks, threads, or both, while $e_{leaf\,parallel}$ is the event when a for-loop affecting the lowest stride (innermost dimension) uses threads or blocks:

$$N_{parallel} = N_{blocks} + N_{threads} + N_{blocksThreads},$$

$$T_{parallel} = 1.0 + 1 N_{blocks} + N_{blocksThreads} > 0 \cdot 8 \cdot 0 +$$

$$1 N_{threads} + N_{blocksThreads} > 0 \cdot 8 \cdot 0 +$$

$$1 e_{leaf\,parallel} \cdot 0 \cdot 5 +$$

$$1 N_{blocks} + _{blocksThreads} + N_{threads} > 0 +$$

$$N_{parallel} \cdot 0 \cdot 2;$$

$$g = (N - N_{parallel}) \cdot 16 + \max(0, N_{parallel} \cdot 16 - T_{parallel}):$$

To obtain a heuristic h the system 100 may compute g over the assigned loop variables, and for the remainder assume that parallelism was achieved using both threads and blocks, thereby providing an admissible heuristic that always underestimates the cost estimate of the kernel.

With the combination of these elements, the system 100 may identify areas of the optimized final input graph in which something needs to be filled in, and a way of identifying every time a change was made to a temporary solution of whether or not the change reduced or increased the processing cost. The system 100 may determine an estimate given all of the operations that have been performed so far, and what the cost will be of performing the remaining operations.

This system 100 begins with a long list that starts out empty, and for every element in the list of operations, the system 100 determines what the options are available to the system 100 for processing an item in the list. The system 100 processes the list in sequence, and every time there is an option in the list for which the system 100 has not yet made a decision, the system 100 generates all possible decisions that could have made, and evaluates the heuristic cost for the solution assuming that the system 100 has made that choice.

Example Fused Kernel Solution

Figure 9:
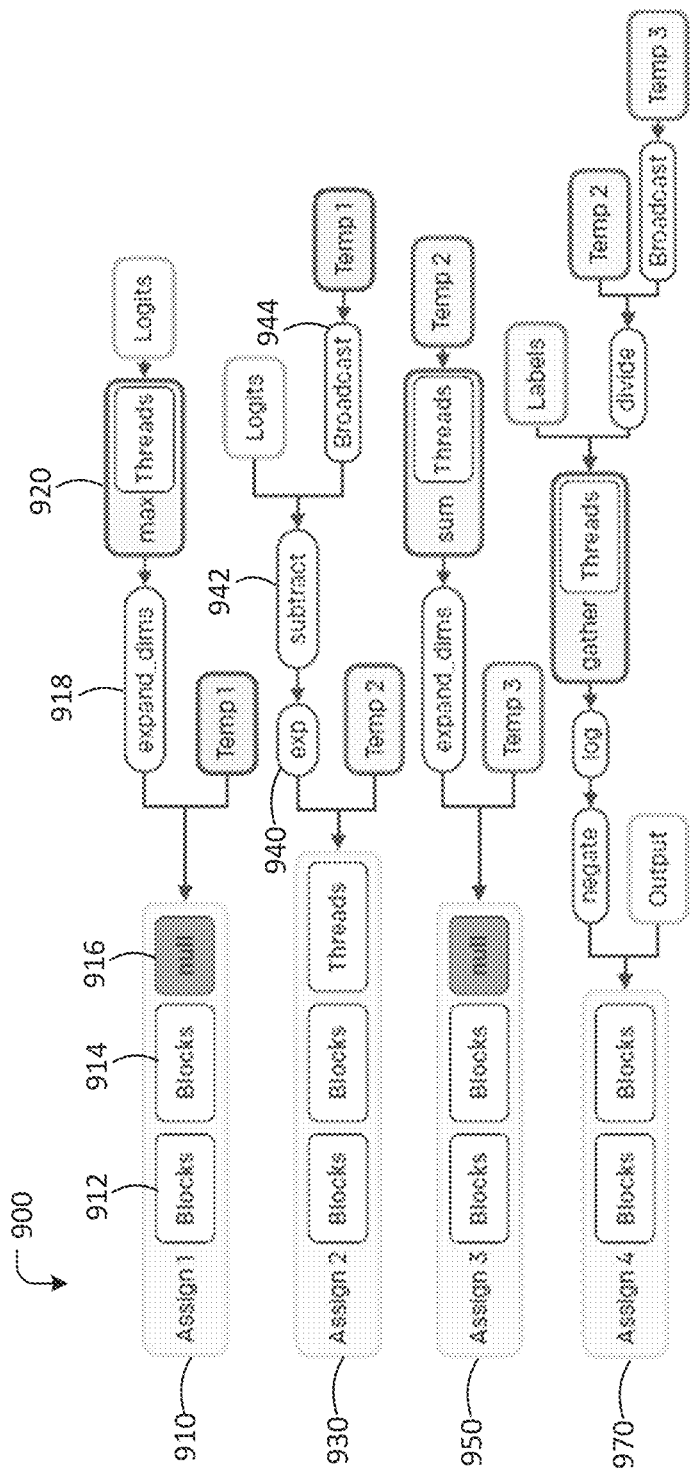
FIG. 9 illustrates an example of a sample output after performing an A* search process.

FIG. 9. represents a solution 900 for a fused kernel that the system 100 has determined based on the A* search process. At the beginning of the A* search process the system 100 would not have any information specifically about what the entire solution is going to look like. Initially, all of the blocks (e.g., blocks 912, 914, 916) for an assignment group 910, 930, 950, 970 that are currently identified in FIG. 9 as "blocks", "thread" or "null" would be empty as the system 100 has not yet determined the type of parallelism operation that may be used.

In this example case for a softmax operation, the system 100 may want to parallelize the max over threads operation 920. There is an assignment operation 910 that is going to receive the max operation and needs to save it to a three dimensional object. For every one of the boxes (blocks 912, blocks 914 and null 916) in the assignment operation 910, the system 100 considers one of those approaches to use for parallelism.

There are different places where the system 100 needs to determine what kind of parallelism the system 100 should use. For example, the max operation 920 indicates "Threads" which means the max operation 920 only has the ability to be run sequentially or with threads. As such there are only two parallelism options about how the max operation 920 can be executed. The "Threads" requirement limits choices of the type of parallel processing may occur in the area of max operation 920, and this will have implications for the rest of the graph. For example, an illustration of this limiting effect is that box 912 is one loop of execution that is going to call into box 914 multiple times, which will call box 916 multiple times which will the call box 920. If box 920 and any of the boxes above it are using the same kind of parallelism, then the way the system 100 may iterate through one of the higher boxes is going to essentially prevent the lower one from using the same kind of parallelism. Thus, conflicts that can arise if in the parent-child relationship, the parent and one of the child use the same manner of parallelism.

The cost for the solution at the beginning is zero and the heuristic for the rest of the search is going to be an assumption that every possible decision that the system 100 is going to make is going to benefit from the maximum amount of parallelism available for a set of operations.

Figure 10:
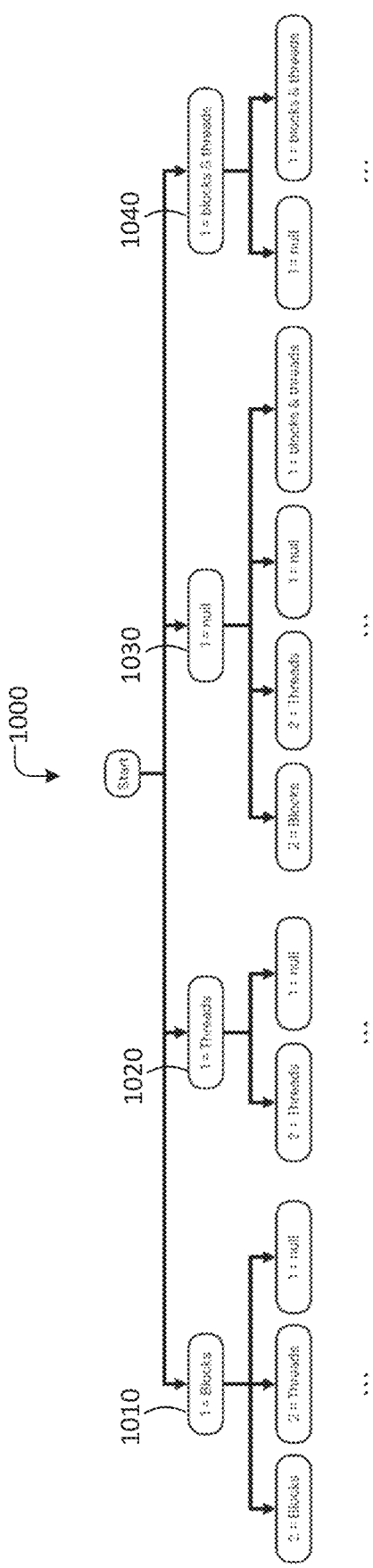
FIG. 10 illustrates an example diagram of parallelism.

Referring to FIG. 10, the diagram illustrates a search tree for determining parallelism processing options. The system 100 performs an iterative search to determine what parallelism processing options should be for each of the assignments 910, 930, 950, 970 as shown in FIG. 9. So for the first assignment 910, assuming no real constraints of what can be done by the system 100, the system 100 may evaluate using four different parallelism processing options: (1) blocks 1010, (2) threads 1020, (3) sequential 1030, or (4) using a mix of blocks and thread 1040. The system 100 may consider all four of these options. However, one of the options may be too expensive to run, cheap to run, or equally cheap to run as another option that is run sequentially but incurs some cost otherwise because it is a non-parallel loop.

The system 100 may then place the particular considered solution at the bottom of a queue of running solutions. However, the heuristic for all of the solutions left may indicate that all of these options, still leave most every other variable in this graph free to be allocated to a variety of options. Initially, few options have been ruled out. However, if, for instance the system 100 picked threads as an option, the ability to use threads in the max operation 920 that follows below, then the system 920 might have made the heuristic cost for the future go up a little. So essentially, the system 100 determines all solutions that are a descendant of the current one, might be a lot more expensive to run. At this point, the system 100 may want to delay or abort this particular branch of the search. The system 100 runs through the A* search process and determines the most suitable type of parallelism for the operations of the JIT block.

The system 100 completing the A* Search process then would have generated an optimized solution with one or more assignment groups for the respective operation of the JIT block. The system 100 may store a data structure and information representing the solution of the optimized JIT block. In the example, the solution is composed of four assignments 910, 930, 950, 970 and has two reductions. Each reduction and assignment can be parallelized in a variety of ways. The final assignment of the loop parallelism for each operation is shown in the assignment groups 910, 930, 950, 970. For example, in assignment group 910 the loop parallelism is shown as blocks 912, blocks 914, and null 916.

GPU Code Generation

The system 100 may generate GPU code (e.g., C or C++ code) by evaluating the data structure of the solution 900 generated by the A* Search process. To generate GPU code for solution of the optimized JIT block, the system 100 generates a series of code strings associated with each of the assign operations 910, 930, 950, 970 and the operations of the sub-graphs associated with the respective assign operation. For example, for the max over threads object 920, the system 100 may generate a string that describes how to run "max" on a GPU on an input array of some dimension.

The system 100 compiles the comprehensive set of code strings to generate machine code that may be performed by one or more GPUs, and/or CPUs. While reference is made to optimization of GPU and/or CPU processors, the system 100 may also generate code for memristor-based processors, ARM mali processors, other variants of custom processors and hardware accelerated processors such as Tensor Processing Units, Cerebras, and Graphcore device. The system 100 may reference the compiled GPU code whenever the system 100 needs to perform the JIT block of operations and determine a result.

Certain nodes of a sub-graph (e.g., the expand_dim 918, max 920, exp 940, subtract 942, broadcast 944, etc.) have two type of strings associated with them. One type of string is used for definitions, and the other type of string is used to describe how to call the particular node. Both types of strings are added to a system 100 generated file (stored in memory or on a storage device) in some specified order. The resulting file with the system 100 generated code may then be dynamically compiled to generate a kernel of code (e.g., a CUDA kernel) that may perform the operations of the JIT block on one or more GPUs.

The first type of string associated with a particular node may describe some header file for a library that needs to be included in the generated GPU code so that a particular operation for the node may be performed. The first type of string includes code that does not have to be run such as definitions and/or header references to include libraries to other code or functions. For example, a library may be needed during compilation to perform specific mathematical operations of the JIT block.

The second type of string associated with a particular node may describe how the respective node may be found or called by other nodes. The system 100 when creating the GPU code may recursively iterate through the operations of the JIT block. For example, the system 100 may create code for the exponential operation 940 that may "call functor of exponential of (and ask subtract 942 how to call subtract 942)". The system 100 then recursively continues through the sub-graph to the broadcast operation 944 asking broadcast how to call itself. The system 100 continues until it has produced a piece of code that describes building the relevant sub-graph. In this manner, the system 100 ensures that the GPU code includes the right headers and libraries to perform operations, and that the GPU code identifies the right order and context for performing the specific operations of the sub-tree of the JIT block (such as broadcast 944, then subtract 942 and the exponential 940).

In further detail, the system 100 performs a for loop that uses the dimensions given by the assignment side and the sub-graph side. For example as to assignment group 930, the system 100 determines for i up to the first dimension of exponent 940, j up to the second dimension, etc. The variable that is represented by the string of 940, uses a method where if it is called using a specific accessor (can be found by its value located at i, j (the ith, jth value of 940). The system 100 would compute that individual item and return a specific value (e.g., an actual value such as float, integer, double, etc.). And similarly for the assignment of temp2 946 the system generates code representing the temporary variable, and wrapper code around reference to memory indicating there is going to be some method for accessing the memory at location i, j of temp2 946. And for assignment group 930 the system 100 is going to generate a string that identifies to obtain the ith, jth value of 940, and save it the ith, jth location of temp2 946, and then increment i, and/or increment j, and so on and so forth.

The system 100 also generates GPU code indicating the left side of the assignment (e.g., assignment groups 910, 930, 950, 970) identifying the memory location where the result of the assignment will be saved to. Also, the system 100 may create strings to generate variables for the right side of the assignment where results for operations can be saved. For example, for the exponential 940, and subtract 942, the system 100 may generate GPU code to save the output of the respective operations to two temporary variables.

The GPU code is considered device code which is executed on a GPU with device variables residing in GPU memory. In some embodiments, the system 100 may solely generate device code for performing the operations of a JIT block. In other embodiments, the system 100 may generate a combination of both device code and host code. Host code is executed on a CPU with host variables residing in CPU memory. For examples, certain sequential operations may be performed by host code and parallel operations may be performed by the device code.

Figure 11:
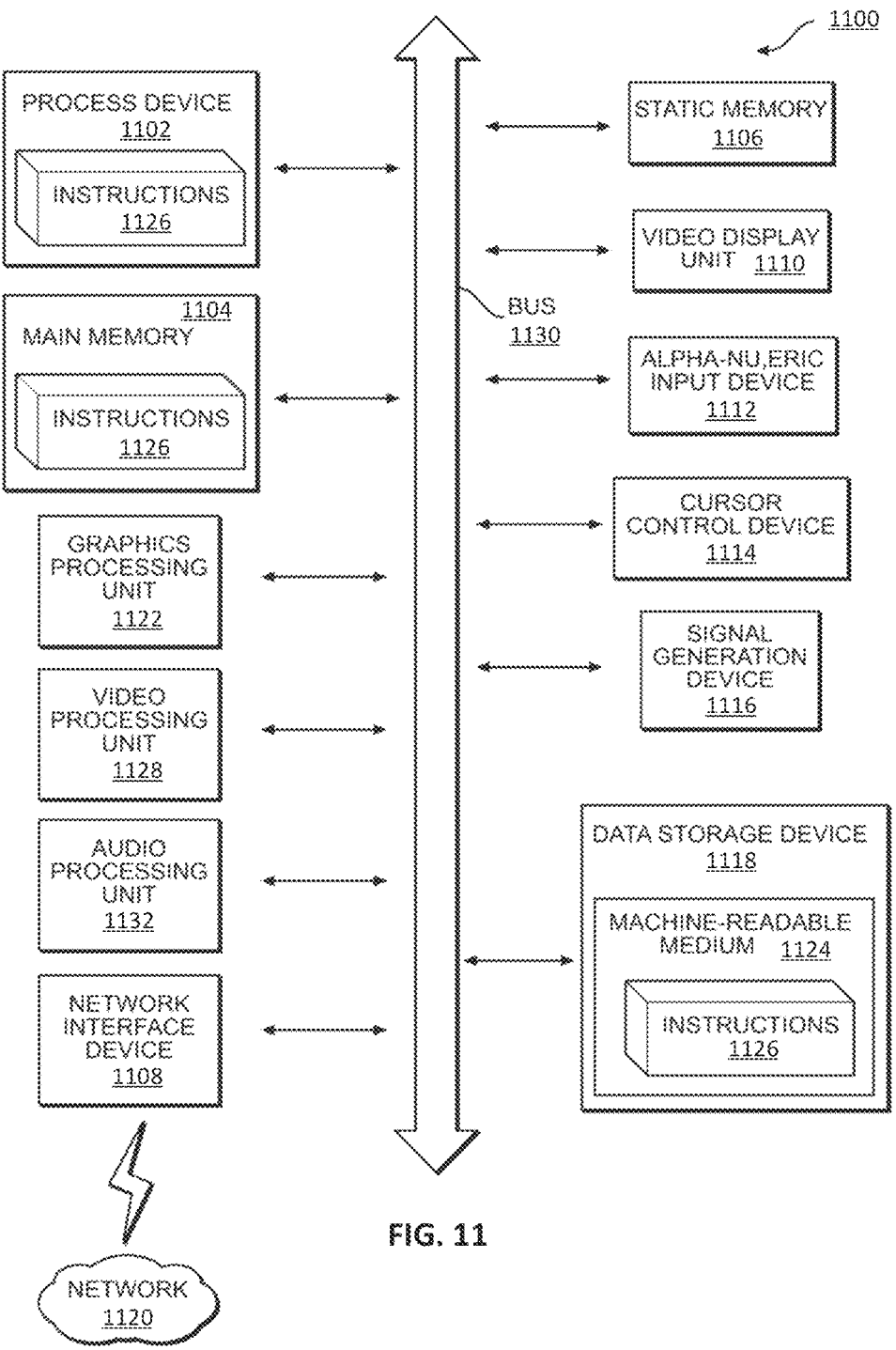
FIG. 11 illustrates an example machine of the computer system.

FIG. 11 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 is configured to execute instructions 1126 for performing the operations and steps discussed herein.

The computer system 1100 may further include a network interface device 1008 to communicate over the network 1120. The computer system 1000 also may include a video display unit 1110 (e.g., a liquid crystal display (LCD) or a cathode ray tube (CRT)), an alphanumeric input device 1112 (e.g., a keyboard), a cursor control device 1144 (e.g., a mouse), a graphics processing unit 1122, a signal generation device 1116 (e.g., a speaker), graphics processing unit 1122, video processing unit 1128, and audio processing unit 1132.

The data storage device 1118 may include a machine-readable storage medium 1124 (also known as a computer-readable medium) on which is stored one or more sets of instructions or software 1126 embodying any one or more of the methodologies or functions described herein. The instructions 1126 may also reside, completely or at least partially, within the main memory 1104 and/or within the processing device 1102 during execution thereof by the computer system 1100, the main memory 1104 and the processing device 1002 also constituting machine-readable storage media.

In one implementation, the instructions 1126 include instructions to implement functionality corresponding to the components of a device to perform the disclosure herein. While the machine-readable storage medium 1124 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as a compact discs, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes a mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A system comprising one or more processors, and a non-transitory computer readable storage medium storing one or more sequences of instructions that, when executed by the one or more processors, cause the system to perform operations comprising:
   generating a first input graph based on translation of user code into a first expression graph, wherein the first expression graph represents control flow of operations of the first input graph;
   performing optimization of the first input graph based on an application of optimization rules, thereby generating an optimized second input graph;
   performing operations of the optimized second input graph and determining a result of the operations of the optimized second input graphs;
   generating a transformation graph by comparing changes made from a structure of the first input graph to a structure of the optimized second input graph; and storing a structure of the transformation graph in a memory cache for subsequent access to generate a new optimized input graph.

2. The system of claim 1, the operations further comprising:
determining a hash value of the first input graph;
generating a third input graph based on translation of user code into a second expression graph, wherein the second expression graph represents control flow of operations of the third input graph;
determining a hash value of the third input graph;
retrieving the transformation graph from the memory cache based on a hash match value of the first input graph and the third input graph;
applying the transformation graph to the third input graph to generate an optimized fourth input graph; and
performing operations of the optimized fourth input graph.

3. The system of claim 1, the performing optimization of the first input graph further comprising:
determining which nodes of the first input graph are combinable to form a block of just-in-time (JIT) operations; and
generating one or more blocks of JIT operations with the nodes of the first input graph determined to be combinable.

4. The system of claim 3, the operations further comprising:
performing optimization of the one or more blocks of JIT operations to determine a parallel processing approach for the one or more blocks of JIT operations; and
generating code based on the determined parallel processing approach for the one or more blocks of JIT operations.

5. The system of claim 1, the performing operations of the optimized second input graph further comprising:
referencing a kernel for a block of operations of the optimized second input graph; and
performing the referenced kernel on a graphic processing unit.

6. The system of claim 1, wherein the optimization rules modify a data structure representing the first input graph to form a modified data structure representing the optimized second input graph.

7. A method implemented by a system comprising one or more processors, the method comprising:
generating a first input graph based on translation of user code into a first expression graph, wherein the first expression graph represents control flow of operations of the first input graph;
performing optimization of the first input graph based on an application of optimization rules, thereby generating an optimized second input graph;
performing operations of the optimized second input graph and determining a result of the operations of the optimized second input graph;
generating a transformation graph by comparing changes made from a structure of the first input graph to a structure of the optimized second input graph; and
storing a structure of the transformation graph in a memory cache for subsequent access to generate a new optimized input graph.

8. The method of claim 7, further comprising:
determining a hash value of the first input graph;
generating a third input graph based on translation of user code into a second expression graph, wherein the second expression graph represents control flow of operations of the third input graph;
determining a hash value of the third input graph;
retrieving the transformation graph from the memory cache based on a hash match value of the first input graph and the third input graph;
applying the transformation graph to the third input graph to generate an optimized fourth input graph; and
performing operations of the optimized fourth input graph.

9. The method of claim 7, the performing optimization of the first input graph further comprising:
determining which nodes of the first input graph are combinable to form a block of just-in-time (JIT) operations; and
generating one or more blocks of JIT operations with the nodes of the first input graph determined to be combinable.

10. The method of claim 9, further comprising:
performing optimization of the one or more blocks of JIT operations to determine a parallel processing approach for the one or more blocks of JIT operations; and
generating code based on the determined parallel processing approach for the one or more blocks of JIT operations.

11. The method of claim 7, the performing operations of the optimized second input graph further comprising:
referencing a kernel for a block of operations of the optimized second input graph; and
performing the referenced kernel on a graphic processing unit.

12. The method of claim 7, wherein the optimization rules modify a data structure representing the first input graph to form a modified data structure representing the optimized second input graph.

13. A non-transitory computer readable storage medium storing instructions that when executed by a system comprising one or more processors, cause the one or more processors to perform operations comprising:
generating a first input graph based on translation of user code into a first expression graph, wherein the first expression graph represents control flow of operations of the first input graph;
performing optimization of the first input graph based on an application of optimization rules, thereby generating an optimized second input graph;
performing operations of the optimized second input graph and determining a result of the operations of the optimized second input graph;
generating a transformation graph by comparing changes made from a structure of the first input graph to a structure of the optimized second input graph; and
storing a structure of the transformation graph in a memory cache for subsequent access to generate a new optimized input graph.

14. The non-transitory computer readable storage medium of claim 13, the operations further comprising:
determining a hash value of the first input graph;
generating a third input graph based on translation of user code into a second expression graph, wherein the second expression graph represents control flow of operations of the third input graph;
determining a hash value of the third input graph;
retrieving the transformation graph from the memory cache based on a hash match value of the first input graph and the third input graph;

applying the transformation graph to the third input graph to generate an optimized fourth input graph; and performing operations of the optimized fourth input graph.

15. The non-transitory computer readable storage medium of claim 13, the performing optimization of the first input graph further comprising:

determining which nodes of the first input graph are combinable to form a block of just-in-time (JIT) operations; and generating one or more blocks of JIT operations with the nodes of the first input graph determined to be combinable.

16. The non-transitory computer readable storage medium of claim 15, the operations further comprising:

performing optimization of the one or more blocks of JIT operations to determine a parallel processing approach for the one or more blocks of JIT operations; and generating code based on the determined parallel processing approach for the one or more blocks of JIT operations.

17. The non-transitory computer readable storage medium of claim 13, the performing operations of the optimized second input graph further comprising:

referencing a kernel for a block of operations of the optimized second input graph; and performing the referenced kernel on a graphic processing unit.

18. The non-transitory computer readable storage medium of claim 13, wherein the optimization rules modify a data structure representing the first input graph to form a modified data structure representing the optimized second input graph.

* * * * *